(12) United States Patent
Cudak et al.

(10) Patent No.: US 10,853,462 B2
(45) Date of Patent: Dec. 1, 2020

(54) AUTHORIZING FILE ACCESS WITH USER I/O AND HARDWARE USAGE PATTERNS

(71) Applicant: LENOVO Enterprise Solutions (Singapore) PTE. LTD., New Tech Park (SG)

(72) Inventors: Gary D. Cudak, Wake Forest, NC (US); John M. Petersen, Apex, NC (US); Shareef F. Alshinnawi, Apex, NC (US); Ajay Dholakia, Cary, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 245 days.

(21) Appl. No.: 15/944,704

(22) Filed: Apr. 3, 2018

(65) Prior Publication Data

US 2019/0303547 A1 Oct. 3, 2019

(51) Int. Cl.
 *G06F 21/31* (2013.01)
 *G06F 21/62* (2013.01)
 *G06F 21/60* (2013.01)
 *H04L 12/26* (2006.01)

(52) U.S. Cl.
 CPC .......... *G06F 21/316* (2013.01); *G06F 21/604* (2013.01); *G06F 21/6209* (2013.01); *H04L 43/04* (2013.01); *G06F 2221/2141* (2013.01)

(58) Field of Classification Search
 CPC .. G06F 21/316; G06F 21/604; G06F 21/6209; G06F 2221/2141; G06F 11/301; G06F 9/45558; G06F 13/105; G06F 2009/45583; G06F 2009/45579; G06F 21/52; G06F 21/54; G06F 21/554; G06F 21/552; G06F 2221/034; H04L 43/04; G06N 20/00
 See application file for complete search history.

(56) References Cited

U.S. PATENT DOCUMENTS

| | | | |
|---|---|---|---|
| 8,321,958 B1 * | 11/2012 | Fleming | G06F 16/9535 726/29 |
| 2006/0282660 A1 * | 12/2006 | Varghese | G06Q 20/341 713/155 |
| 2018/0129803 A1 * | 5/2018 | Levin | G06F 21/552 |
| 2019/0332766 A1 * | 10/2019 | Guri | H04L 63/1491 |

* cited by examiner

*Primary Examiner* — Theodore C Parsons
*Assistant Examiner* — Sangseok Park
(74) *Attorney, Agent, or Firm* — Kunzler Bean & Adamson; Bruce R. Needham (57) ABSTRACT

An apparatus for authorizing file access events includes a processor and a memory that stores code executable by the processor. The code is executable by the processor to record hardware usage patterns prior to a file access event of a file, and correlate the hardware usage patterns with file access events targeting the file. The code is also executable to receive a file access event targeting the file, compare a hardware usage pattern preceding the received file access event targeting the file to the hardware usage patterns correlated with file access events targeting the file, and authorize the received file access event in response to the hardware usage pattern preceding the received file access event targeting the file matching a hardware usage pattern correlated to a file access event targeting the file.

16 Claims, 5 Drawing Sheets

AUTHORIZING FILE ACCESS WITH USER I/O AND HARDWARE USAGE PATTERNS

FIELD

The subject matter disclosed herein relates to file and more particularly relates to authorizing file access events when a hardware usage pattern prior to a received file access event matches a hardware usage pattern correlated to a file access event targeting the file.

BACKGROUND

Unauthorized parties, such as hackers, parties attempting to control files of a computing device for a ransom, and others with bad intentions often gain access to file on a computing device. Often, the unauthorized access is not detected by anti-virus applications, malware detection applications, firewalls, and the like.

BRIEF SUMMARY

An apparatus for authorizing file access events is disclosed. A method and computer program product also perform the functions of the apparatus. The apparatus includes a processor and a memory that stores code executable by the processor. The code is executable by the processor to record hardware usage patterns prior to a file access event of a file, and correlate the hardware usage patterns with file access events targeting the file. The code is also executable to receive a file access event targeting the file, compare a hardware usage pattern preceding the received file access event targeting the file to the hardware usage patterns correlated with file access events targeting the file, and authorize the received file access event in response to the hardware usage pattern preceding the received file access event targeting the file matching a hardware usage pattern correlated to a file access event targeting the file.

A method for authorizing file access events includes recording hardware usage patterns prior to a file access event of a file, and correlating the hardware usage patterns with file access events targeting the file. The method includes receiving a file access event targeting the file, comparing a hardware usage pattern preceding the received file access event targeting the file to the hardware usage patterns correlated with file access events targeting the file, and authorizing the received file access event in response to the hardware usage pattern preceding the received file access event targeting the file matching a hardware usage pattern correlated to a file access event targeting the file.

A program product for authorizing file access events includes a computer readable storage medium that stores code executable by a processor. The executable code includes code to record hardware usage patterns prior to a file access event of a file, and correlate the hardware usage patterns with file access events targeting the file. The executable code includes code to receive a file access event targeting the file, compare a hardware usage pattern preceding the received file access event targeting the file to the hardware usage patterns correlated with file access events targeting the file, and authorize the received file access event in response to the hardware usage pattern preceding the received file access event targeting the file matching a hardware usage pattern correlated to a file access event targeting the file.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more non-transitory computer readable storage devices storing machine readable code, computer readable code, and/or program code, referred hereafter as code. In a certain embodiment, the data storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The data storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the data storage device would include the following: an electrical connection having one or more wires, a portable computer diskette, a hard disk, a random-access memory (RAM), a read-only memory (ROM), an erasable programmable read-only memory (EPROM), a Flash memory, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). Modules may include hardware circuits, a programmable hardware device, a processor executing code and/or code stored on a non-transitory computer readable storage device, or any combination thereof.

Reference throughout this specification to "one embodiment," "an embodiment," or similar language means that a particular feature, structure, or characteristic described in connection with the embodiment is included in some embodiments. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the data storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for authorizing file access events includes a processor and a memory that stores code executable by the processor. The code is executable by the processor to record hardware usage patterns prior to a file access event of a file, and correlate the hardware usage patterns with file access events targeting the file. The code is also executable to receive a file access event targeting the file, compare a hardware usage pattern preceding the received file access event targeting the file to the hardware usage patterns correlated with file access events targeting the file, and authorize the received file access event in response to the hardware usage pattern preceding the received file access event targeting the file matching a hardware usage pattern correlated to a file access event targeting the file.

In some embodiments, a hardware usage pattern includes a pattern of one or more input/output ("I/O") device actions of a user prior to a file access event. In other embodiments, the pattern of one or more I/O device actions includes one or more I/O device actions of the user to select and access the file. In other embodiments, an I/O device action includes keyboard input, mouse input, touchscreen input, audio input, and/or camera input.

In other embodiments, comparing a hardware usage pattern preceding the received file access event targeting the file to the hardware usage patterns correlated with file access events targeting the file includes comparing one or more I/O device actions preceding the received file access event targeting the file to one or more I/O device actions correlated with file access events targeting the file. In the embodiment, authorizing the received file access event in response to the hardware usage pattern preceding the received file access event targeting the file matching a hardware usage pattern correlated to a file access event targeting the file includes authorizing the received file access event in response to a threshold number of I/O device actions preceding the received file access event matching I/O device actions correlated to file access events targeting the file.

In other embodiments, correlating the hardware usage patterns with file access events targeting the file includes detecting a pattern of I/O device actions prior to a file access event targeting the file and correlating the detected pattern of I/O device actions with the file access event. In other embodiments, recording hardware usage patterns prior to a file access event of a file includes recording one or more I/O device actions prior to a file access event of a file, where recording one or more I/O device actions is over a network connection from one or more remote I/O devices during a remote session with a remote computing device or from one or more I/O devices connected to a computing device comprising the processor.

In some embodiments, a hardware usage pattern includes an amount of network I/O traffic, an amount of network I/O traffic from an I/O device, a central processing unit ("CPU") usage level, and/or an amount of communication bus traffic. In other embodiments, correlating the hardware usage patterns with file access events targeting the file includes detecting a hardware usage pattern preceding a file access event targeting the file and associating the detected hardware usage pattern with the file access event. In other embodiments, authorizing the received file access event in response to the hardware usage pattern preceding the received file access event targeting the file matching a hardware usage pattern correlated to a file access event targeting the file includes authorizing the received file access event in response to a threshold number of hardware usage patterns preceding the received file access event matching hardware usage patterns correlated to file access events targeting the file.

In other embodiments, authorizing the received file access event in response to the hardware usage pattern preceding the received file access event targeting the file matching a hardware usage pattern correlated to a file access event targeting the file includes authorizing the received file access event in response to the hardware usage pattern preceding the received file access event targeting the file matching a hardware usage pattern correlated to a file access event targeting the file above a match threshold level. In other embodiments, the apparatus includes code executable by the processor to block the received file access event in response to determining that the hardware usage pattern preceding the received file access event targeting the file correlates to a hardware usage pattern preceding a file access event indicative of a hardware access event requested by an unauthorized party.

A method for authorizing file access events includes recording hardware usage patterns prior to a file access event of a file, and correlating the hardware usage patterns with file access events targeting the file. The method includes receiving a file access event targeting the file, comparing a hardware usage pattern preceding the received file access event targeting the file to the hardware usage patterns correlated with file access events targeting the file, and authorizing the received file access event in response to the hardware usage pattern preceding the received file access event targeting the file matching a hardware usage pattern correlated to a file access event targeting the file.

In some embodiments, a hardware usage pattern includes a pattern of one or more I/O device actions of a user prior to a file access event. In other related embodiments, the pattern of one or more I/O device actions includes one or more I/O device actions of the user to select and access the file. In other embodiments, comparing a hardware usage pattern preceding the received file access event targeting the file to the hardware usage patterns correlated with file access events targeting the file includes comparing one or more I/O device actions preceding the received file access event targeting the file to one or more I/O device actions correlated with file access events targeting the file. In other further embodiments, authorizing the received file access event in response to the hardware usage pattern preceding the received file access event targeting the file matching a hardware usage pattern correlated to a file access event targeting the file includes authorizing the received file access event in response to a threshold number of I/O device actions preceding the received file access event matching I/O device actions correlated to file access events targeting the file.

In other embodiments, correlating the hardware usage patterns with file access events targeting the file includes detecting a pattern of I/O device actions prior to a file access event targeting the file and correlating the detected pattern of I/O device actions with the file access event. In other embodiments, correlating the hardware usage patterns with file access events targeting the file includes detecting a hardware usage pattern preceding a file access event targeting the file and correlating the detected hardware usage pattern with the file access event and/or authorizing the received file access event in response to a threshold number of hardware usage patterns matching hardware usage patterns correlated to file access events targeting the file. In other embodiments, the method includes blocking the received file access event in response to determining that the hardware usage pattern preceding the received file access event targeting the file correlates to a hardware usage pattern preceding a file access event indicative of a hardware access event requested by an unauthorized party.

A program product for authorizing file access events includes a computer readable storage medium that stores code executable by a processor. The executable code includes code to record hardware usage patterns prior to a file access event of a file, and correlate the hardware usage patterns with file access events targeting the file. The executable code includes code to receive a file access event targeting the file, compare a hardware usage pattern preceding the received file access event targeting the file to the hardware usage patterns correlated with file access events targeting the file, and authorize the received file access event in response to the hardware usage pattern preceding the received file access event targeting the file matching a hardware usage pattern correlated to a file access event targeting the file.

Figure 1:
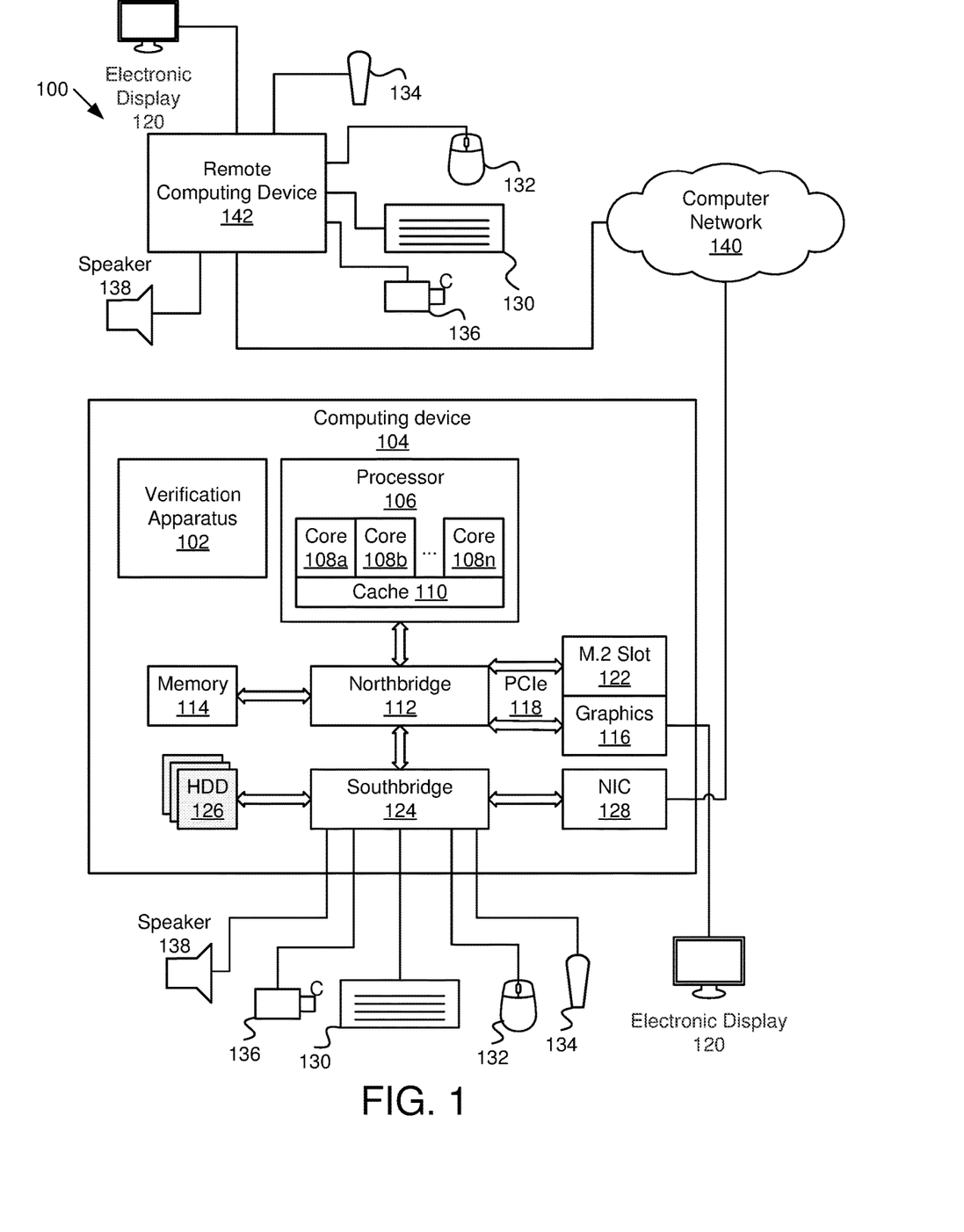
FIG. 1 is a schematic block diagram illustrating one embodiment of a system for authorizing file access with user input/output ("I/O") and hardware usage patterns.

FIG. 1 is a schematic block diagram illustrating one embodiment of a system 100 for authorizing file access with user I/O and hardware usage patterns. The system 100 includes a verification apparatus 102 in a computing device 104 with a processor 106 with N cores 108*a*, 108*b*, . . . 108*n* and cache 110, a northbridge 112, memory 114, a graphics card 116, connected over a peripheral component interconnect express ("PCIe") bus 118, an electronic display 120, an M.2 slot 122 connected over a PCIe bus 118, a southbridge 124, hard disk drives 126, a network interface card ("NIC") 128, keyboards 130, mice 132, microphones 134, cameras 136, speakers 138, a computer network 140, and a remote computing device 142, which are described below.

The system 100 includes a verification apparatus 102 that records hardware usage patterns, which may also be I/O device actions, prior to a file access event of a file, correlates the hardware usage patterns with file access events targeting the file, receives a file access event targeting the file, compares a hardware usage pattern preceding the received file access event targeting the file to the hardware usage patterns correlated with file access events targeting the file, and authorizes the received file access event in response to the hardware usage pattern preceding the received file access event targeting the file matching a hardware usage pattern correlated to a file access event targeting the file. The verification apparatus 102 is described in more detail with regard to the apparatuses 200, 300 of FIGS. 2 and 3.

The system 100 includes a computing device 104, which may be a desktop computer, a laptop computer, a tablet computer, a workstation, a mainframe computer, a smartphone, a fitness tracking device, a game controller, or other computing device where a file is accessed by a user. The computing device 104 includes a processor 106 that includes one or more cores 108*a*, 108*b* . . . 108*n* (collectively "108") and corresponding cache 110. The processor 106, in some embodiments, may be referred to as a central processing unit ("CPU"). In other embodiments, each core 108 may be called a CPU. In some embodiments, the computing device 104 may include a baseboard management controller ("BMC") (not shown) or a similar device to manage each core, virtual machines, loading, and other functions known to those in the art. The computing device 104 may include a northbridge 112 that connects to memory 114 over a memory bus. A graphics card, which may be external, may connect to the northbridge 112 through a PCIe bus 118 and may drive an electronic display 120. The electronic display 120 may be separate or may be integrated with the computing device 104 and may be a touch screen I/O device.

The computing device 104 may also include an M.2 slot 122 which also connects to the northbridge 112 over a PCIe bus 118. The M.2 slot 122 may accommodate devices that comply with the M.2 form factor and standards. The southbridge 124 is connected to the northbridge 112 and may connect to various devices, such as hard disk drives ("HDD") 126, a network interface card ("NIC") 128, a keyboard 130, a mouse 132, a microphone 134, a camera 136, a speaker 138 and the like. Note that other non-volatile storage devices may be in or connected to the computing device 104, such as a solid-state drive ("SSD") which may be in addition to or in place of the hard disk drives 126. The keyboard 130, mouse 132, microphone 134, camera 136, electronic display 120, stylus (not shown), etc. are typical I/O devices that are capable of receiving input from a user to control the computing device 104. The speaker 138 and electronic display 120 are typical I/O devices that receive signals from the computing device 104 to provide output to a user as feedback for commands and other input from the user input through the keyboard 130, mouse 132, microphone 134, etc.

In some embodiments, the system 100 includes a remote computing device 142 connected to the computing device 104 through a computer network 140. The remote computing device 142 may input commands over the computer network 140 to the computing device 104 through I/O devices, such as a keyboard 130, a mouse 132, a microphone 134, a camera 136, electronic display 120, etc., for example, when an application allows remote access to the computing device 104.

The computer network 140 may be a local area network ("LAN"), a wide area network ("WAN"), the Internet, a wireless network, etc. and may include two or more networks. The computer network 140 includes typical network hardware, such as routers, switches, servers, cabling, and the like.

The wireless network may be a mobile telephone network. The wireless network may also employ a Wi-Fi network based on any one of the Institute of Electrical and Electronics Engineers ("IEEE") 802.11 standards. Alternatively, the wireless network may be a BLUETOOTH® connection or a near-field communication ("NFC") connection. In addition, the wireless network may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless network may employ a ZigBee® connection based on the IEEE 802 standard. In one embodiment, the wireless network employs a Z-Wave® connection as designed by Sigma Designs®. Alternatively, the wireless network may employ an ANT® and/or ANT-F® connection as defined by Dynastream® Innovations Inc. of Cochrane, Canada.

The wireless network may be an infrared connection including connections conforming at least to the Infrared Physical Layer Specification ("IrPHY") as defined by the Infrared Data Association® ("IrDA" ®). Alternatively, the wireless network may be a cellular telephone network communication. All standards and/or connection types include the latest version and revision of the standard and/or connection type as of the filing date of this application.

Figure 2:
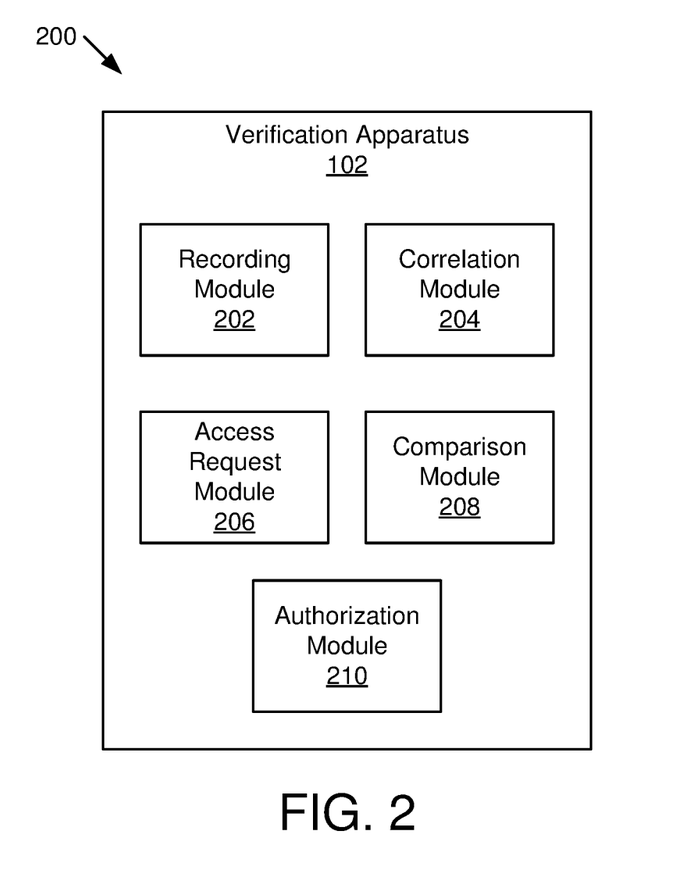
FIG. 2 is a schematic block diagram illustrating one embodiment of an apparatus for authorizing file access with user I/O and hardware usage patterns.

FIG. 2 is a schematic block diagram illustrating one embodiment of an apparatus 200 for authorizing file access with user I/O and hardware usage patterns. The apparatus 200 includes one embodiment of a verification apparatus 102 with a recording module 202, a correlation module 204, an access request module 206, a comparison module 208, and an authorization module 210, which are described below.

The apparatus 200 includes a recording module 202 that records hardware usage patterns prior to a file access event of a file. In one embodiment, the file access event is received by the computing device 104, which has access to the file. For example, the file may be stored on a hard disk drive 126, an SSD, in memory 114, etc. of the computing device 104. In another embodiment, the computing device 104 has access to the file, which is stored external to the computing device 104, such as on an external storage device, on a storage area network ("SAN"), a rack-mounted storage device, and the like. In another embodiment, the verification apparatus 102 is on a server, BMC, or other device that monitors, routes or controls file access events of a file.

The file access event may be a request to read all or a portion of contents of the file, to write to the file, to store the file, to copy the file, to move the file, or other action known to those of skill in the art. The file is a group of bytes of data, commands, instructions, etc. on a data storage device, such as an HDD 126, SSD, memory 114, etc. that is accessed as a unit. The file may be a data file, an application, a portion of an application, a script, a macro, an image, or other group of bytes accessed together. Typically, the file includes an address, which is used to access the file. Typically, a file includes a header with information about the file, such as a size, ending address or other way to delineate how many bits or bytes are considered part of the file. The file may include metadata with information about the file. One of skill in the art will recognize other types of files and ways to store and access a file.

In one embodiment, a hardware usage pattern a pattern of one or more I/O device actions of a user prior to a file access event. In some embodiments, the pattern of one or more I/O device actions includes one or more I/O device actions of the user to select and access the file. For example, the I/O events may be keyboard input, mouse input in the form of mouse movement, mouse clicks, etc., audio input, camera input, stylus input, touchscreen input, or other input from a user. In another embodiment, the hardware usage pattern includes a level of activity on the processor 106, core 108, etc., a level of network I/O traffic, a level of memory access, a level of disk access, and/or other measurable hardware usage statistic. In another embodiment, a hardware usage pattern includes specific commands, such as a file access command, a mouse double click on a file icon, application icon, etc., keyboard input that select a file to be opened, a call to start an application, or other action to specifically access a particular file.

In some embodiments, the recording module 202 record a hardware usage pattern prior to a file access event for an interval typical of a time a user takes to access a file. For example, the recording module 202 may record a hardware usage pattern for several seconds before the file access event. For example, "prior to" may include as much as a minute or more before the file access event. In other embodiments, "prior to" may include the 30 seconds just prior to the file access event. In other embodiments, "prior to" may include 5-10 seconds just prior to the file access event. In other embodiments, for example, when looking at network I/O activity levels, a processor level, etc, a shorter recordation period may be used. In some embodiments, the recording module 202 may record just past a file access event, for example, until the file is accessed, until a user interacts with a file, etc. One of skill in the art will recognize a time period appropriate for the recording module 202 to record a hardware usage pattern.

In one embodiment, the recording module 202 records one or more I/O device actions prior to a file access event of a file over a network connection from one or more remote I/O devices (e.g. 120, 130, 132, 134, 136) during a remote session with a remote computing device 142. In some embodiments, an authorized user of the computing device 104 establishes the remote I/O session. In another embodiment, the remote I/O session is at an established IP address that has been established by an authorized user of the computing device 104. For example, the remote I/O session may be authorized through an authorization process by an application accessed by an authorize user prior to the remote I/O session or to establish the remote I/O session. For example, the remote I/O session may be distinguished from unauthorized access to the computing device 104 by establishing an authorized remote I/O session with a username and passwords, through an authorized application, to an established IP address, etc.

In some embodiments, hardware usage patterns recorded by the recording module 202 may be indistinguishable from hardware usage patterns from hardware and I/O devices connected to the computing device 104. In other embodiments, the recording module 202 distinguishes between hardware usage patterns from a remote computing device 142 and from the computing device 104 and the recording module 202 may record an indicator that the recorded hardware usage patterns are from an authorized remote computing device 142.

The apparatus 200 includes a correlation module 204 that correlate the hardware usage patterns with file access events targeting the file. For example, the correlation module 204 may correlate all I/O events from I/O devices, such as a keyboard 130, a mouse 132, a microphone 134, a camera 136, etc. for a period of time before a file access event of a file, which may then be a hardware usage pattern for the file, and the correlation module 204 may then associate this hardware usage pattern with the file. For example, the correlation module 204 may store the hardware usage pattern and file access event along with the file name, file address, or other identifier of the file.

In another embodiment, the correlation module 204 examines data recorded by the recording module 202 prior to a file access event of the file and then analyzes the recorded data to find one or more patterns within the recorded data where each identified pattern is a hardware usage pattern. The correlation module 204 then associates the file with any hardware usage patterns found in the recorded data. In one embodiment, the correlation module 204 identifies particular commands as a hardware usage pattern, such as a command to access the file. The command to access the file may be a double-click on a mouse 132 on an icon of the file on the electronic display 120, may be touchscreen input to an electronic display 120, may be keyboard input to select the file available on a file/folder structure, may be a keystroke to select a file icon, may be audio input that includes voice command to select the file, and the like.

In another embodiment, the correlation module 204 identifies within the recorded data typical user patterns to select a file, to open a file, to record over a file, etc. For example, the file may be used by a particular application and the correlation module 204 may identify a hardware usage pattern as mouse movement and clicks, touchscreen input, keyboard input, etc. within the program to navigate to a file icon of the file and to open, access, overwrite, etc. the file. For instance, the correlation module 204 may identify accessing an "Open File" command, navigation to a file and selection of the file.

In some embodiments, the correlation module 204 looks for patterns typical of a file access by comparing the recorded data with known file access patterns. For example, over time the correlation module 204 may build up a library of typical hardware usage patterns, commands, hardware usage levels, etc. that often occur before a file is accessed and may then statistically correlate identified patterns with the recorded data to identify a hardware usage pattern.

The correlation module 204, in some embodiments, uses machine learning to identify hardware usage patterns within the recorded data. The correlation module then associates the accessed file with any identified hardware uses patterns. The machine learning may include elements of artificial intelligence. The machine learning may include an ability to "learn," e.g. progressively improving performance on a specific task over time, without being specifically programmed. Machine learning may include pattern recognition and computational learning techniques known in the art.

In other embodiments, the correlation module 204 correlates particular hardware usage patterns with particular file access events targeting the file. For example, the correlation module 204 may correlate one hardware usage pattern with a file access event of opening the file and may correlate another hardware usage pattern with a file access event of writing to the file. Thus, a particular file may have several file access events of different types correlated with different hardware usage patterns. A particular file access event type, in some embodiments, may be associated several hardware usage patterns. The file may be correlated to several file access event types, and each file access event type may be correlated to one or more hardware usage patterns.

In other embodiments, the recording module 202 identifies hardware usage patterns in recorded data preceding a file access event of a file and the correlation module 204 correlates the identified hardware usage patterns with file access events of the file by associating an identifier of the file with the file access event and one or more identified hardware usage patterns. One of skill in the art will recognize other ways that the correlation module 204 may correlate hardware usage patterns found in data recorded by the recording module 202 with file access events targeting a file.

The apparatus 200 includes an access request module 206 that receive a file access event targeting the file and a comparison module 208 that compares a hardware usage pattern preceding the received file access event targeting the file to the hardware usage patterns correlated with file access events targeting the file. For example, once the recording module 202 has recorded hardware usage patterns prior to file access events of a file and the correlation module 204 has correlated the hardware usage patterns with the file access events targeting the file, the request module 206 may receive a file access event targeting the file.

The comparison module 208 may access the hardware usage patterns correlated to the file targeted by the received file access event and may then compare a hardware usage pattern (e.g. hardware levels, I/O events, etc.) preceding the received file access event targeting the file to the hardware usage patterns previously correlated to file access events targeting the file to file one or more matches. In one embodiment, the recording module 202 records hardware usage patterns preceding the file access event targeting the file that was received by the access request module 206 and the access request module 206 triggers the comparison module 208.

In some embodiments, the comparison module 208 uses similar methods and techniques that the correlation module 204 uses to identify hardware usage patterns within the recorded data preceding the file access event targeting the file received by the access request module 206. The comparison module 208 may then identify matches between hardware usage patterns found in the recorded data preceding the received file access event targeting the file received by the access request module 206 with hardware usage patterns previously correlated with file access events of the file.

In some embodiments, the comparison module 208 identifies exact matches between hardware usage patterns found in the recorded data preceding the received file access event targeting the file received by the access request module 206 and hardware usage patterns previously correlated with file access events of the file. In other embodiments, the comparison module 208 identifies matches statistically between hardware usage patterns found in the recorded data preceding the received file access event targeting the file received by the access request module 206 and hardware usage patterns previously correlated with file access events of the file and may return a percentage match or other scaled identifier indicating a quality level of a match. In other embodiments, matches identified by the comparison module 208 include a combination of exact matches, statistical matches, etc.

In some embodiments, the comparison module 208 identifies matches by file access event type. For example, the comparison module 208 may return a match of 92 percent for a file access type of opening a file and may return a match of 51 percent for a file access type of writing to a file. Overlapping I/O events, commands, etc. may account for the comparison module 208 identifying different file access event types as potential matches where the various identified file access events may have different levels of matching. One of skill in the art will recognize other ways that the comparison module 208, recording module 202 or correlation module 204 may identify hardware usage patterns preceding a received file access event targeting a file that was received by the access request module 206 and may compare the identified hardware usage patterns with hardware usage patterns previously correlated with file access events targeting the file.

The apparatus 200 includes an authorization module 210 that authorizes the received file access event in response to the hardware usage pattern preceding the received file access event targeting the file matching a hardware usage pattern correlated to a file access event targeting the file. In one embodiment, authorizing the file access event includes allowing the file access event to proceed. For example, if the file access event is a request to open the file, the authorization module 210 allows the file to be opened according to the file access event. Authorizing the file access event may include allowing information within the file to be accessed by an application, by a user at the remote computing device 142, may allow the file to edited, overwritten, deleted, and the like.

In another embodiment, the authorization module 210 authorizing the received file access event includes not blocking the received file access event. The authorization module 210 may not take any action to block the received file access event where there is a match rather than an affirmative action.

Beneficially, authorizing the received file access event in response to the hardware usage pattern preceding the received file access event targeting the file matching a hardware usage pattern correlated to a file access event targeting the file increases security by helping to ensure that the file access event did not originate through an unauthorized party, such as a party trying to steal personal information, a party trying to hold data on the computing device hostage, etc. Often times an unauthorized party uses a script, a program, etc. that will exhibit a different hardware usage pattern than a user requesting access through an I/O device.

Figure 3:
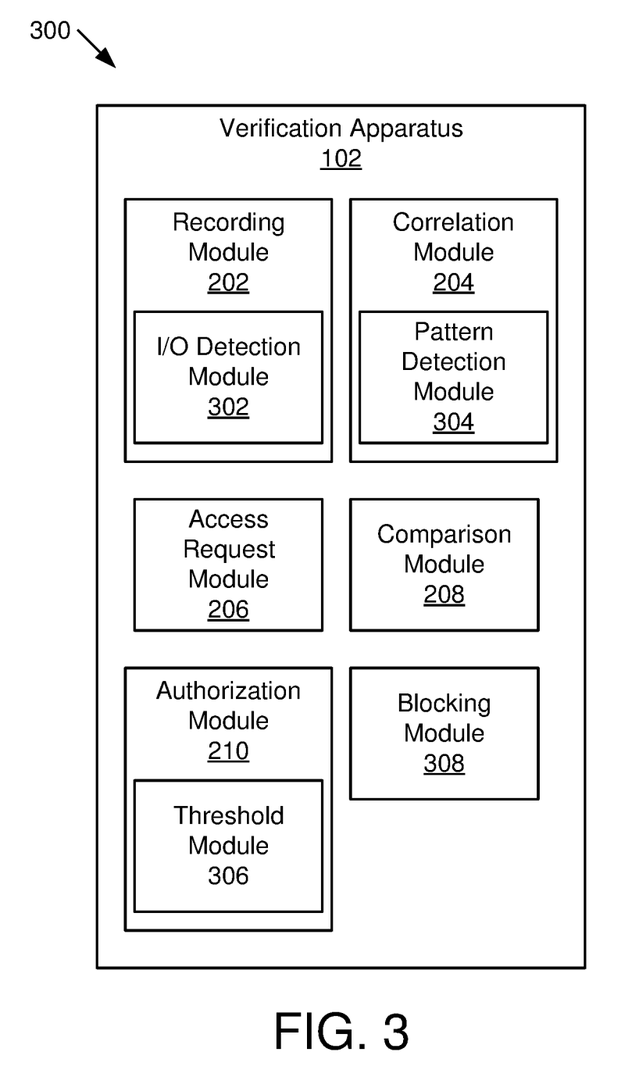
FIG. 3 is a schematic block diagram illustrating another embodiment of an apparatus for authorizing file access with user I/O and hardware usage patterns.

FIG. 3 is a schematic block diagram illustrating one embodiment of another apparatus 300 for authorizing file access with user I/O and hardware usage patterns. The apparatus 300 includes another embodiment of the verification apparatus 102 with a recording module 202, a correlation module 204, an access request module 206, a comparison module 208, and an authorization module 210, which are substantially similar to those of the apparatus 200 of FIG. 2. The apparatus 300, in various embodiments, also includes an I/O detection module 302, a pattern detection module 304, and a threshold module 306, which are described below.

In one embodiment, the apparatus 300 includes an I/O detection module 302 in the recording module 202 that records one or more hardware usage patterns that include a pattern of one or more I/O device actions of a user prior to a file access event. The apparatus 300 may also include a pattern detection module 304 in the correlation module 204 that correlates one or more patterns of one or more I/O device actions with a file targeted by the file access event. The pattern detection module 304 may identify one or more patterns of I/O device actions within I/O device actions recorded by the I/O detection module 302. In one embodiment, the I/O detection module 302 records I/O device actions prior to the file access event of a file for a certain period of time prior to the file access event.

In one embodiment, the pattern of one or more I/O device actions includes one or more I/O device actions of the user to select and access the file. For example, the I/O device actions to select the file may include mouse movement over an icon representing the file and a mouse double-click on the icon were the mouse 132 is connected to the computing device 104. In another example, the I/O device actions to select the file may include keyboard input for maneuvering a cursor to a menu where an open file command is located, navigating to an "Open File" menu option, selecting the "Open File" menu option, selecting a "Browse" menu option, navigating to a file icon representing the file and selecting the file icon.

A pattern of I/O device actions may vary due to where the user is within an application at the time of the file selection. For example, a pattern of I/O device actions may be shorter where an "Open File" menu option is already selected, for example, if the user selected a different file just previous to selecting the file targeted by the file access event. In various embodiments, the I/O device actions may include keyboard input, mouse input, touchscreen input, audio input, camera input, and the like. One of skill in the art will recognize other ways that the I/O detection module 302 and the pattern detection module 304 may record I/O device actions prior to a file access event, may identify patterns of one or more I/O device actions, and may correlate the patterns of I/O device actions with the file targeted by the file access event.

Where the I/O detection module 302 records hardware usage patterns with patterns of I/O device actions, the comparison module 208 may compare one or more I/O device actions preceding the received file access event targeting the file to one or more I/O device actions correlated with file access events targeting the file, and the authorization module 210 may authorize the received file access event in response to a threshold number of I/O device actions preceding the received file access event matching I/O device actions correlated to file access events targeting the file. In one embodiment, the authorization module 210 may authorize the received file access event where a pattern of I/O device actions matches a pattern of I/O device action correlated to the file targeted by the received file access event.

In another embodiment, the authorization module 210 may authorize the received file access event where I/O device actions in a pattern of I/O device actions match I/O device actions correlated to the file targeted by the received file access event. In another embodiment, the authorization module 210 may authorize the received file access event where a pattern of I/O device actions matches a pattern of I/O device action correlated to the file targeted by the received file access event. One of skill in the art will recognize other ways that the comparison module 208 and the authorization module 210 may compare I/O device actions and/or patterns of I/O device actions of a received file access event to I/O device actions and/or patterns of I/O device actions correlated to file access events of a file.

The apparatus 300, in one embodiment, includes a threshold module 306 in the authorization module 210 that authorizes the received file access event in response to a threshold number of hardware usage patterns preceding the received file access event targeting a file matching hardware usage patterns correlated to file access events targeting the file. The hardware usage patterns preceding the received file access event may include I/O device actions, particular commands, hardware device levels, etc. The threshold number of hardware usage patterns may be a number as low as one pattern and may be a number corresponding to several patterns or more.

In some embodiments, the threshold module 306 may authorize the received file access event where a threshold number of I/O device actions in a pattern of I/O device actions match I/O device actions in a pattern correlated to the file targeted by the received file access event. In another embodiment, the threshold module 306 may authorize the received file access event where a threshold number of patterns of I/O device actions match patterns of I/O device action correlated to the file targeted by the received file access event.

In another embodiment, the authorization module 210 authorizes the received file access event in response to the hardware usage pattern preceding the received file access event targeting the file matching a hardware usage pattern correlated to a file access event targeting the file above a match threshold level. For example, the match threshold level may be 70 percent where the hardware usage pattern preceding the received file access event targeting the file has a 70 percent match to the hardware usage pattern correlated to a file access event targeting the file.

The comparison module 208, in some embodiments, may statistically match a hardware usage pattern preceding the received file access event targeting the file matching a hardware usage pattern correlated to a file access event targeting the file and may return a number such as 70 percent. The comparison module 208 may use other numbers, ranges, etc. For example, the comparison module 208 may return a number within a range of zero to 10, from A to F, and the like. In other embodiments, the threshold module 306 may authorize the received file access event based on both a match threshold level and a threshold number of hardware usage patterns matching correlated hardware usage patterns. One of skill in the art will recognize other ways that the threshold module 306 may use thresholds to authorize a received file access event.

The apparatus 300, in some embodiments, includes a blocking module 306 that blocks the received file access event in response to determining that the hardware usage pattern preceding the received file access event targeting the file correlates to a hardware usage pattern preceding a file access event indicative of a hardware access event requested by an unauthorized party. For example, the blocking module 308 may recognize certain known hardware usage patterns associated with an unauthorized party sending a file access request targeting a file and may determine that the hardware usage pattern preceding the received file access event targeting the file matches a known hardware usage patterns associated with an unauthorized party sending a file access request targeting a file and may block the received file access event.

In other embodiments, the blocking module 308 blocks a received file access event where the comparison module 208 does not match a hardware usage pattern preceding the received file access event with a hardware usage pattern correlated to a hardware usage pattern targeting the file. This embodiment may be activated once the correlation module 204 has correlated a number of hardware usage patterns with file access events targeting the file. One of skill in the art will recognize other forms of the blocking module 308 to block file access events by an unauthorized party.

Figure 4:
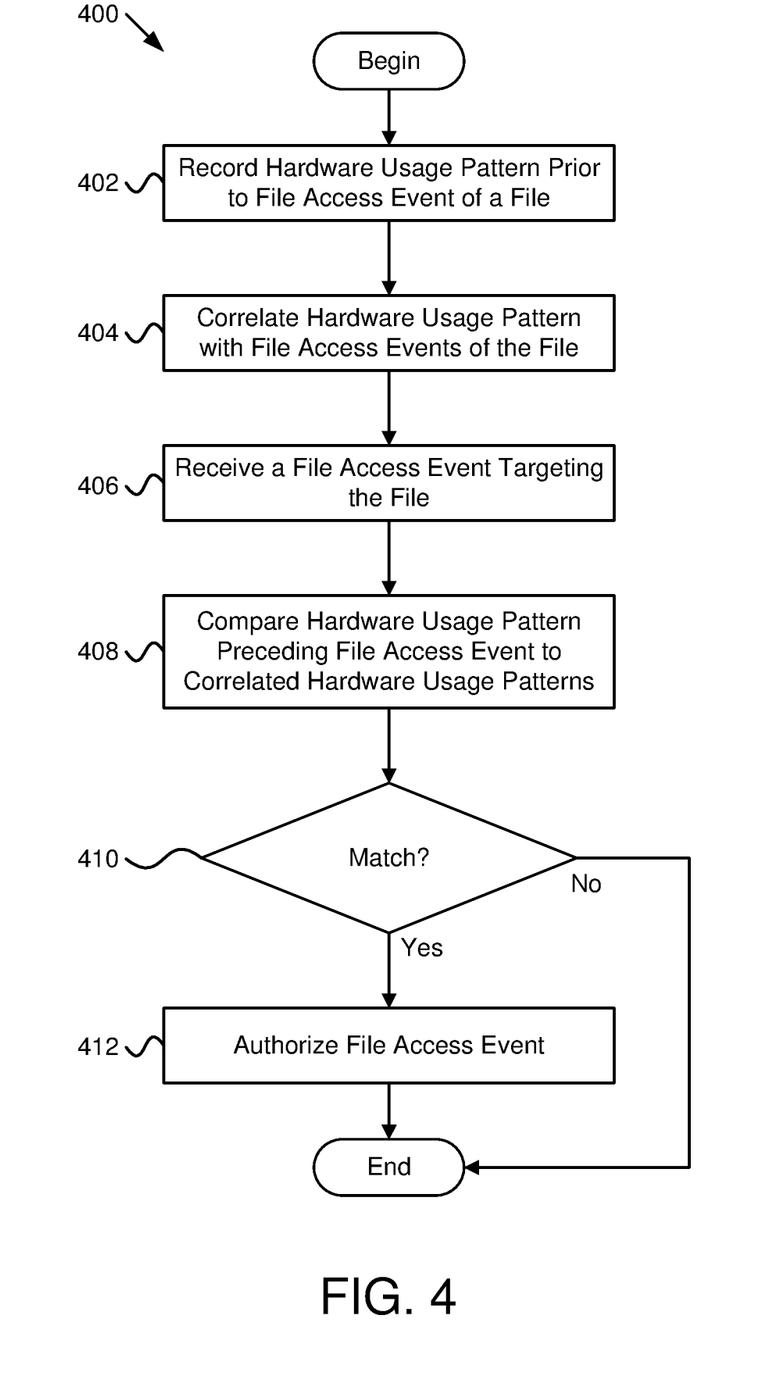
FIG. 4 is a schematic flow chart diagram illustrating one embodiment of a method for authorizing file access with user I/O and hardware usage patterns.

FIG. 4 is a schematic flow chart diagram illustrating one embodiment of a method 400 for authorizing file access with user I/O and hardware usage patterns. The method 400 begins and records 402 hardware usage patterns prior to a file access event of a file and correlates 404 the hardware usage patterns with file access events targeting the file. The method 400 receives 406 a file access event targeting the file and compares 408 a hardware usage pattern preceding the received file access event targeting the file to the hardware usage patterns correlated with file access events targeting the file. The method 400 determines 410 if there is a match between the hardware usage pattern preceding the received file access event targeting the file and a hardware usage pattern correlated to a file access event targeting the file.

If the method 400 determines 410 that there is a match between the hardware usage pattern preceding the received file access event targeting the file and a hardware usage pattern correlated to a file access event targeting the file, the method 400 authorizes the received file access event, and the method 400 ends. If the method 400 determines 410 that there is a match between the hardware usage pattern preceding the received file access event targeting the file and a hardware usage pattern correlated to a file access event targeting the file, the method 400 ends. All or portions of the steps of the method 400 may be implemented using the recording module 202, the correlation module 204, the access request module 206, the comparison module 208, the authorization module 210, the I/O detection module 302, and/or the pattern detection module 304.

Figure 5:
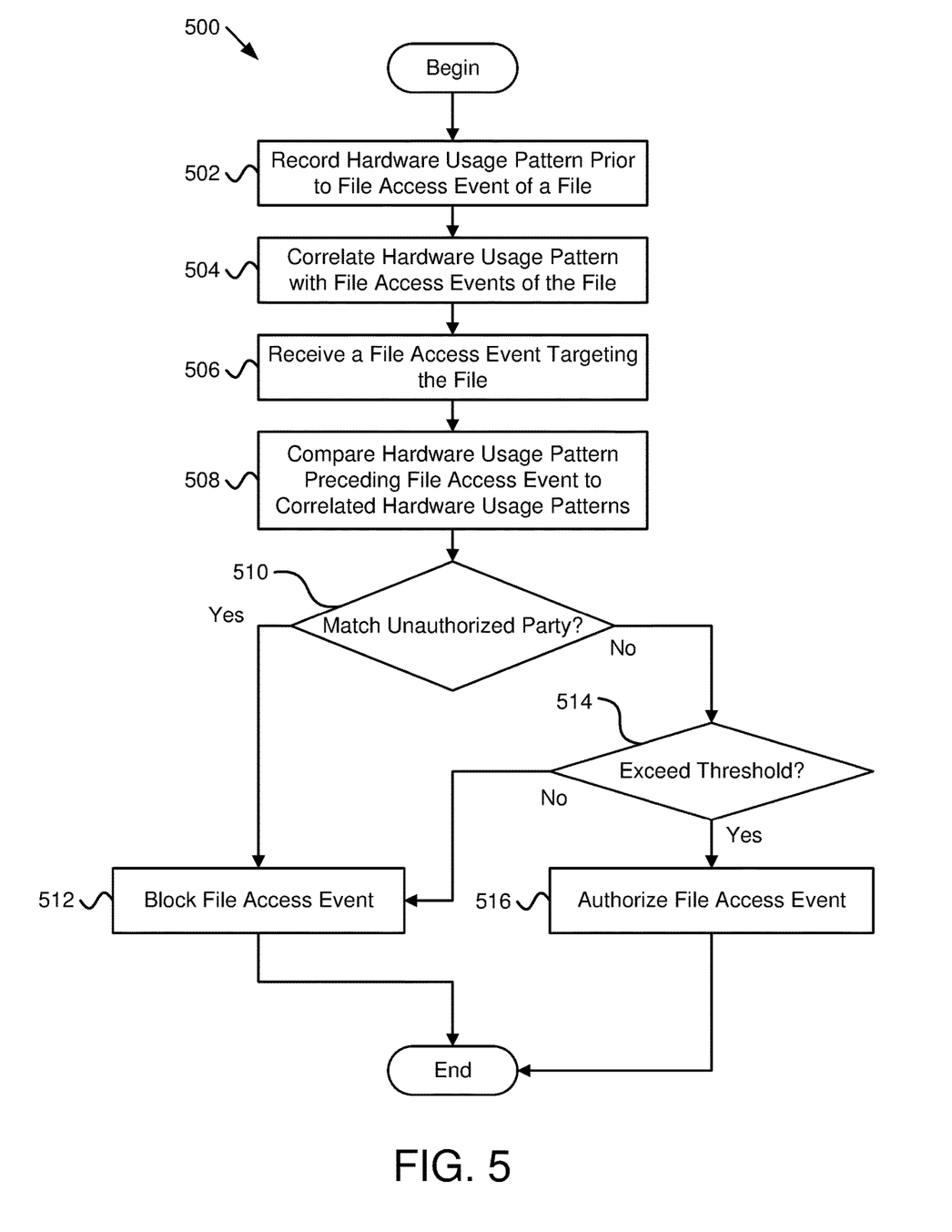
FIG. 5 is a schematic flow chart diagram illustrating another embodiment of a method for authorizing file access with user I/O and hardware usage patterns.

FIG. 5 is a schematic flow chart diagram illustrating one embodiment of another method 500 for authorizing file access with user I/O and hardware usage patterns. The method 500 begins and records 502 hardware usage patterns prior to a file access event of a file and correlates 504 the hardware usage patterns with file access events targeting the file. The method 500 receives 506 a file access event targeting the file and compares 508 a hardware usage pattern preceding the received file access event targeting the file to the hardware usage patterns correlated with file access events targeting the file.

The method 500 determines 510 if there is a match between a hardware usage pattern corresponding to a file access event of an unauthorized party and a hardware usage pattern preceding the received file access event. If the method 500 determines 510 that there is a match between a hardware usage pattern corresponding to a file access event of an unauthorized party and a hardware usage pattern preceding the received file access event, the method 500 blocks the received file usage event, and the method 500 ends.

If the method 500 determines 510 that there is not a match between a hardware usage pattern corresponding to a file access event of an unauthorized party and a hardware usage pattern preceding the received file access event, the method 500 determines 514 if the hardware usage pattern preceding the received file access event targeting the file match a hardware usage pattern correlated to a file access event targeting the file above a match threshold level and/or if a threshold number of hardware usage patterns preceding the received file access event matches hardware usage patterns correlated to file access events targeting the file.

If the method 500 determines 514 that a threshold is exceeded, the method 500 authorizes 516 the received file access event and the method 500 ends. If the method 500 determines 514 that a threshold is not exceeded, the method 500 ends. All or portions of the steps of the method 400 may be implemented using the recording module 202, the correlation module 204, the access request module 206, the comparison module 208, the authorization module 210, the I/O detection module 302, the pattern detection module 304, the threshold module 306 and/or the blocking module 308.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor; and
   a memory that stores code executable by the processor to:
      record a first hardware usage pattern comprising input/output ("I/O") device actions of a user to select and access a file, the first hardware usage pattern prior to a first file access event;
      correlate the first hardware usage pattern with the first file access event targeting the file and store the first hardware usage pattern and the correlation with the first file access event targeting the file;
      store a plurality of first hardware usage patterns, each stored with a different first hardware access event targeting the file, each first hardware usage pattern and associated first usage event is stored in association with the file;

receive a second file access event targeting the file;

access the stored plurality of first usage patterns and associated usage events associated with the file;

compare a second hardware usage pattern preceding the received second file access event targeting the file to the stored first hardware usage patterns correlated with stored first file access events targeting the file; and authorize the received second file access event in response to the second hardware usage pattern matching a stored first hardware usage pattern correlated to a stored first file access event targeting the file.

2. The apparatus of claim 1, wherein an I/O device action comprises one or more of keyboard input, mouse input, touchscreen input, audio input, and camera input.

3. The apparatus of claim 1, wherein:

comparing the second hardware usage pattern to the stored first hardware usage patterns correlated with stored first file access events targeting the file comprises comparing one or more I/O device actions preceding the received second file access event targeting the file to one or more I/O device actions of the first hardware usage patterns correlated with the stored first file access events targeting the file; and authorizing the received second file access event in response to the second hardware usage pattern matching a stored first hardware usage pattern correlated to a stored first file access event targeting the file comprises authorizing the received second file access event in response to a threshold number of I/O device actions preceding the received second file access event matching stored I/O device actions correlated to stored first file access events targeting the file.

4. The apparatus of claim 1, wherein correlating the first hardware usage pattern with a first file access event targeting the file comprises detecting a pattern of I/O device actions prior to a first file access event targeting the file and correlating the detected pattern of I/O device actions with the first file access event.

5. The apparatus of claim 1, wherein recording the first hardware usage patterns comprising the I/O device actions is one of:

over a network connection from one or more remote I/O devices during a remote session with a remote computing device; and from one or more I/O devices connected to a computing device comprising the processor.

6. The apparatus of claim 1, wherein a hardware usage pattern comprises one or more of an amount of network I/O traffic, an amount of network I/O traffic from an I/O device, a central processing unit ("CPU") usage level, and an amount of communication bus traffic.

7. The apparatus of claim 1, wherein correlating the first hardware usage pattern with a first file access event targeting the file comprises detecting a first hardware usage pattern preceding a first file access event targeting the file and associating the detected first hardware usage pattern with the first file access event.

8. The apparatus of claim 1, wherein authorizing the received second file access event in response to the second hardware usage pattern matching a stored first hardware usage pattern correlated to a stored first file access event targeting the file comprises authorizing the received second file access event in response to a threshold number of second hardware usage patterns preceding the received second file access event matching stored first hardware usage patterns correlated to stored first file access events targeting the file.

9. The apparatus of claim 1, wherein authorizing the received second file access event in response to the second hardware usage pattern preceding the received second file access event targeting the file matching a stored first hardware usage pattern correlated to a stored first file access event targeting the file comprises authorizing the received second file access event in response to the second hardware usage pattern preceding the received second file access event targeting the file matching a stored first hardware usage pattern correlated to a stored first file access event targeting the file above a match threshold level.

10. The apparatus of claim 1, further comprising code executable by the processor to block the received second file access event in response to determining that the second hardware usage pattern preceding the received second file access event targeting the file correlates to a hardware usage pattern preceding a file access event indicative of a hardware access event requested by an unauthorized party.

11. A method comprising:

recording a hardware usage pattern comprising input/output ("I/O") device actions of a user to select and access a file, the hardware usage pattern prior to a first file access event, the first file access event selecting and accessing the file;

correlating the first hardware usage pattern with the first file access event targeting the file and storing the first hardware usage pattern and the correlation with the first file access event targeting the file;

storing a plurality of first hardware usage patterns, each stored with a different first hardware access event targeting the file, each first hardware usage pattern and associated first usage event is stored in association with the file;

receiving a second file access event targeting the file;

accessing the stored plurality of first usage patterns and associated usage events associated with the file;

comparing a second hardware usage pattern preceding the received second file access event targeting the file to the stored first hardware usage patterns correlated with stored first file access events targeting the file; and authorizing the received second file access event in response to the second hardware usage pattern preceding the received second file access event targeting the file matching a stored first hardware usage pattern correlated to a stored first file access event targeting the file.

12. The apparatus of claim 11, wherein:

comparing the second hardware usage pattern to the stored first hardware usage patterns correlated with stored first file access events targeting the file comprises comparing one or more I/O device actions preceding the received second file access event targeting the file to one or more I/O device actions of the first hardware usage patterns correlated with the stored first file access events targeting the file; and authorizing the received second file access event in response to the second hardware usage pattern matching a stored first hardware usage pattern correlated to a stored first file access event targeting the file comprises authorizing the received second file access event in response to a threshold number of I/O device actions preceding the received second file access event matching stored I/O device actions correlated to stored first file access events targeting the file.

13. The apparatus of claim 11, wherein correlating the first hardware usage pattern with a first file access event targeting the file comprises detecting a pattern of I/O device actions prior to a first file access event targeting the file and correlating the detected pattern of I/O device actions with the first file access event.

14. The method of claim 11, wherein correlating the first hardware usage pattern with a first file access event targeting the file comprises one or more of:

detecting a first hardware usage pattern preceding a first file access event targeting the file and correlating the detected first hardware usage pattern with the first file access event; and authorizing the received second file access event in response to a threshold number of second hardware usage patterns matching stored first hardware usage patterns correlated to stored first file access events targeting the file.

15. The method of claim 11, further comprises blocking the received second file access event in response to determining that the second hardware usage pattern preceding the received second file access event targeting the file correlates to a hardware usage pattern preceding a file access event indicative of a hardware access event requested by an unauthorized party.

16. A program product comprising a non-transitory computer readable storage medium that stores code executable by a processor, the executable code comprising code to:

record a first hardware usage pattern comprising input/output ("I/O") device actions of a user to select and access the file, the first hardware usage pattern prior to a first file access event, the first file access event selecting and accessing the file;

correlate the first hardware usage pattern with file a first access event targeting the file and store the first hardware usage pattern and the correlation with the first file access event targeting the file;

store a plurality of first hardware usage patterns, each stored with a different first hardware access event targeting the file, each first hardware usage pattern and associated first usage event is stored in association with the file;

receive a second file access event targeting the file;

access the stored plurality of first usage patterns and associated usage events associated with the file;

compare a second hardware usage pattern preceding the received second file access event targeting the file to the stored first hardware usage patterns correlated with stored first file access events targeting the file; and authorize the received second file access event in response to the second hardware usage pattern matching a stored first hardware usage pattern correlated to a stored first file access event targeting the file.

* * * * *